United States Patent
Yang et al.

(10) Patent No.: US 12,040,494 B2
(45) Date of Patent: Jul. 16, 2024

(54) NEGATIVE ELECTRODES FOR SECONDARY LITHIUM BATTERIES AND METHODS OF MAKING THE SAME

(71) Applicant: GM GLOBAL TECHNOLOGY OPERATIONS LLC, Detroit, MI (US)

(72) Inventors: Xingyi Yang, Sterling Heights, MI (US); Xingcheng Xiao, Troy, MI (US); Joel G. Toner, Imlay City, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 372 days.

(21) Appl. No.: 17/205,574

(22) Filed: Mar. 18, 2021

(65) Prior Publication Data

US 2022/0302459 A1    Sep. 22, 2022

(51) Int. Cl.
*H01M 4/66* (2006.01)
*H01M 4/02* (2006.01)
(Continued)

(52) U.S. Cl.
CPC ......... *H01M 4/661* (2013.01); *H01M 4/0438* (2013.01); *H01M 4/139* (2013.01);
(Continued)

(58) Field of Classification Search
CPC .... H01M 4/661; H01M 4/0438; H01M 4/139; H01M 4/386; H01M 10/052; H01M 10/058; H01M 10/446; H01M 2004/021
(Continued)

(56) References Cited

U.S. PATENT DOCUMENTS 8,440,350 B1    5/2013  Verbrugge et al.
8,859,144 B2    10/2014 Xiao
(Continued)

FOREIGN PATENT DOCUMENTS

CN    111081968 A  *  4/2020  .......... H01M 10/052
CN    115117294 A     9/2022
(Continued)

OTHER PUBLICATIONS

Tsai (Cai) Machine translation (Year: 2020).*
(Continued)

*Primary Examiner* — Matthew T Martin
*Assistant Examiner* — Paul Christian St Wyrough
(74) *Attorney, Agent, or Firm* — Harness, Dickey & Pierce, P.L.C.

(57) ABSTRACT

A negative electrode for a secondary lithium battery is provided herein, as well as a method for assembling a secondary lithium battery including the negative electrode. The negative electrode includes a current collector having a first side and an opposite second side. A first negative electrode layer is disposed on the first side of the current collector and a second negative electrode layer is disposed on the second side of the current collector. A lithium metal layer is disposed (i) between the first and second negative electrode layers or (ii) on a major facing surface of the first or second negative electrode layer. An electrolyte infiltrates the first and second negative electrode layers and is in contact with the lithium metal layer. The electrolyte establishes a lithium ion transport path between the lithium metal layer and at least one of the first or second negative electrode layers.

16 Claims, 2 Drawing Sheets

(51) Int. Cl.
*H01M 4/04* (2006.01)
*H01M 4/139* (2010.01)
*H01M 4/38* (2006.01)
*H01M 10/052* (2010.01)
*H01M 10/058* (2010.01)
*H01M 10/44* (2006.01)

(52) U.S. Cl.
CPC ......... *H01M 4/386* (2013.01); *H01M 10/052* (2013.01); *H01M 10/058* (2013.01); *H01M 10/446* (2013.01); *H01M 2004/021* (2013.01)

(58) Field of Classification Search
USPC .......................................................... 429/209
See application file for complete search history.

(56) References Cited

U.S. PATENT DOCUMENTS

| | | |
|---|---|---|
| 8,999,584 B2 | 4/2015 | Jiang et al. |
| 9,005,811 B2 | 4/2015 | Xiao et al. |
| 9,093,705 B2 | 7/2015 | Xiao et al. |
| 9,142,830 B2 | 9/2015 | Xiao et al. |
| 9,302,914 B2 | 4/2016 | Liu et al. |
| 9,362,551 B2 | 6/2016 | Sachdev et al. |
| 9,379,374 B2 | 6/2016 | Liu et al. |
| 9,531,004 B2 | 12/2016 | Xiao et al. |
| 9,564,639 B2 | 2/2017 | Huang |
| 9,570,752 B2 | 2/2017 | Huang et al. |
| 9,577,251 B2 | 2/2017 | Xiao et al. |
| 9,705,154 B2 | 7/2017 | Lee et al. |
| 9,780,361 B2 | 10/2017 | Xiao et al. |
| 10,062,898 B2 | 8/2018 | Xiao |
| 10,164,245 B2 | 12/2018 | Huang |
| 10,593,988 B2 | 3/2020 | Xiao et al. |
| 10,854,882 B2 | 12/2020 | Halalay et al. |
| 10,868,307 B2 | 12/2020 | Huang |
| 10,950,846 B2 | 3/2021 | Xiao et al. |
| 11,228,037 B2 | 1/2022 | Huang et al. |
| 11,349,119 B2 | 5/2022 | Halalay et al. |
| 2018/0205114 A1 | 7/2018 | Pauric et al. |
| 2019/0044137 A1* | 2/2019 | Zhamu ................. H01M 4/134 |
| 2019/0207205 A1* | 7/2019 | Adair ................. H01M 4/0483 |
| 2020/0212493 A1* | 7/2020 | Busacca ............ H01M 10/0525 |
| 2022/0140324 A1 | 5/2022 | Ellison et al. |

FOREIGN PATENT DOCUMENTS

| | | | |
|---|---|---|---|
| DE | 102021131654 A1 | 9/2022 | |
| WO | WO-2017152836 A1 * | 9/2017 | .......... H01M 10/052 |

OTHER PUBLICATIONS

Chen, WO 2017152836 A1 (machine translation) (Year: 2017).*

U.S. Appl. No. 17/085,785, filed Oct. 30, 2020.

Florian Holtstiege, et al., "Pre-Lithiation Strategies for Rechargeable Energy Storage Technologies: Concepts, Promises and Challenges", Batteries Apr. 4, 2018; doi: 10.3309/batteries4010004, www.mdpicom/journal/batteries, 39 pages.

Xingcheng Xiao, et al., "Regulated Breathing Effect of Silicon Negative Electrode for Dramatically Enhanced Performance of li-Ion BATTERY", Adv. Funct. Mater. 2015, 25, wileyonlinelibrary.com, pp. 1426-1433.

* cited by examiner

FIG. 1

NEGATIVE ELECTRODES FOR SECONDARY LITHIUM BATTERIES AND METHODS OF MAKING THE SAME

INTRODUCTION

The present invention relates to negative electrodes for secondary lithium batteries and, more particularly, to methods of making prelithiated negative electrodes and secondary lithium batteries including the prelithiated negative electrodes.

A battery is a device that converts chemical energy into electrical energy by means of electrochemical reduction-oxidation (redox) reactions. In secondary or rechargeable batteries, these electrochemical reactions are reversible, which allows the batteries to undergo multiple charge and discharge cycles.

Secondary lithium batteries generally comprise one or more electrochemical cells that operate by reversibly passing lithium ions between a negative electrode and a positive electrode. The negative and positive electrodes are oftentimes disposed on opposite sides of a porous polymeric separator, and each of the negative and positive electrodes is typically carried on, or connected to, a metallic current collector. The negative and positive electrodes and the polymeric separator are infiltrated with an ionically conductive electrolyte that provides a medium for the conduction of lithium ions through the electrochemical cell between the negative and positive electrodes. In practice, an electrochemical potential is established between the negative and positive electrodes of the electrochemical cell by connecting their respective current collectors to one another via an interruptible external circuit. During discharge, the electrochemical potential established between the negative and positive electrodes drives spontaneous redox reactions within the electrochemical cell and the release of lithium ions and electrons at the negative electrode. The released lithium ions travel from the negative electrode to the positive electrode through the ionically conductive electrolyte, and the electrons travel from the negative electrode to the positive electrode via the external circuit, which generates an electric current. After the negative electrode has been partially or fully depleted of lithium, the electrochemical cell may be recharged by connecting the negative and positive electrodes to an external power source, which drives nonspontaneous redox reactions within the electrochemical cell and the release of the lithium ions and the electrons from the positive electrode.

During initial charging of a secondary lithium battery, an electrically insulating and ionically conductive layer referred to as a solid electrolyte interphase (SEI) may inherently form in-situ on a surface of the negative electrode at an interface between the negative electrode and the electrolyte. This native SEI is believed to inherently form due to the low reduction potential of the electrochemically active material of the negative electrode, which promotes reduction of the electrolyte at the surface of the negative electrode. The SEI forms an ionically conductive (allows transport of $Li^+$ ions) and electrically insulating barrier between the negative electrode and the electrolyte. As such, the formation of a stable SEI on the negative electrode may help prevent further physical contact and undesirable side reactions from occurring between the negative electrode material and the electrolyte during operation of the battery. However, the chemical reactions between the negative electrode material and the electrolyte that occur during formation of the SEI are parasitic and may consume active lithium, which may lead to irreversible capacity loss and reduced cycle life of the battery.

When silicon (Si) and/or tin (Sn) is used as the electrochemically active material of the negative electrode, the inherent volume changes experienced by the negative electrode during repeated battery cycling may undermine the stability of the SEI, potentially leading to cracks or gaps in the SEI. These cracks or gaps may disrupt the electrically insulating barrier function of the SEI and may lead to further lithium-consuming chemical reactions between the electrolyte and the exposed surfaces of the negative electrode and the formation of new SEI material. As such, when silicon is used as a negative electrode material in a lithium battery, active lithium may be continuously consumed even after initial SEI formation due to repeated exposure of the negative electrode material to the electrolyte and the inherent in-situ formation of new SEI material along exposed surfaces of the negative electrode.

To compensate for the loss of active lithium during battery cycling, a stoichiometric excess of lithium may be incorporated into electrochemical cells of secondary lithium batteries.

SUMMARY

A negative electrode for a secondary lithium battery is provided. The negative electrode includes a negative electrode current collector having a first side and an opposite second side. A first porous negative electrode active material layer is disposed on the first side of the negative electrode current collector. A second porous negative electrode active material layer is disposed on the second side of the negative electrode current collector. A lithium metal layer is disposed (i) between the first porous negative electrode active material layer and the second porous negative electrode active material layer or (ii) on a major facing surface of the first porous negative electrode active material layer or on a major facing surface of the second porous negative electrode active material layer. An electrolyte infiltrates the first porous negative electrode active material layer and the second porous negative electrode active material layer. The electrolyte is in contact with at least a portion of a major surface of the lithium metal layer. The electrolyte establishes a lithium ion transport path between the lithium metal layer and at least one of the first porous negative electrode active material layer or the second porous negative electrode active material layer.

The lithium metal layer may be disposed between the first porous negative electrode active material layer and the second porous negative electrode active material layer.

The negative electrode current collector may include a first porous metal layer and a second porous metal layer spaced apart from the first porous metal layer. The lithium metal layer may be sandwiched between confronting surfaces of the first porous metal layer and the second porous metal layer. The electrolyte may be in contact with at least a portion of a first major surface and at least a portion of an opposite second major surface of the lithium metal layer.

The first porous negative electrode active material layer may be disposed on a major surface of the first porous metal layer and the second porous negative electrode active material layer may be disposed on a major surface of the second porous metal layer.

The negative electrode current collector may be nonporous. In such case, a first lithium metal layer may be disposed on the first side of the negative electrode current collector and a second lithium metal layer may be disposed on the second side of the negative electrode current collector. The first porous negative electrode active material layer may be disposed on the first side of the negative electrode current collector over the first lithium metal layer. The second porous negative electrode active material layer may be disposed on the second side of the negative electrode current collector over the second lithium metal layer.

The first and second lithium metal layers may be nonporous.

The negative electrode current collector may be porous and may include a plurality of through-holes extending from the first side to the second side thereof. In such case, at least a portion of the first porous negative electrode active material layer or the second porous negative electrode active material layer may extend at least part-way into the plurality of through-holes in the negative electrode current collector.

The lithium metal layer may be disposed on a major facing surface of the first porous negative electrode active material layer or on a major facing surface of the second porous negative electrode active material layer.

The negative electrode current collector may be porous and may include a plurality of through-holes extending from the first side to the second side thereof. In such case, the lithium metal layer may be disposed on the first side of the negative electrode current collector over the first porous negative electrode active material layer. Or the lithium metal layer may be disposed on the second side of the negative electrode current collector over the second porous negative electrode active material layer.

At least one of the first porous negative electrode active material layer or the second porous negative electrode active material layer may include a silicon-based electrochemically active material.

The lithium metal layer may be nonporous and may have a thickness in a range of 20 micrometers to 40 micrometers.

A secondary lithium battery is provided. The battery includes a positive electrode and a double-sided negative electrode. The positive electrode includes a porous positive electrode active material layer electrically coupled to a positive electrode current collector. The double-sided negative electrode includes a negative electrode current collector having a first side and an opposite second side. A first porous negative electrode active material layer is disposed on the first side of the negative electrode current collector. A second porous negative electrode active material layer is disposed on the second side of the negative electrode current collector. A lithium metal layer is disposed (i) between the first porous negative electrode active material layer and the second porous negative electrode active material layer or (ii) on a major facing surface of the first porous negative electrode active material layer or on a major facing surface of the second porous negative electrode active material layer. A porous separator layer is disposed between the porous positive electrode active material layer of the positive electrode and the first or second porous negative electrode active material layer of the negative electrode. An electrolyte infiltrates the porous separator layer, the porous positive electrode active material layer of the positive electrode, the first porous negative electrode active material layer of the negative electrode, and the second porous negative electrode active material layer of the negative electrode. The electrolyte is in contact with at least a portion of a major surface of the lithium metal layer. The electrolyte establishes a lithium ion transport path between the lithium metal layer and at least one of the first porous negative electrode active material layer or the second porous negative electrode active material layer.

The lithium metal layer may be nonporous. In such case, prior to initial charging or cycling of the battery, the lithium metal layer may not create a physical barrier to the transport of lithium ions between the porous positive electrode active material layer of the positive electrode and the first or second porous negative electrode active material layer of the negative electrode.

The negative electrode current collector may include a first porous metal layer and a second porous metal layer spaced apart from the first porous metal layer. In such case, the lithium metal layer may be sandwiched between confronting surfaces of the first porous metal layer and the second porous metal layer. The electrolyte may be in contact with at least a portion of a first major surface and at least a portion of an opposite second major surface of the lithium metal layer.

The negative electrode current collector may be nonporous. In such case, a first nonporous lithium metal layer may be disposed on the first side of the negative electrode current collector, a second nonporous lithium metal layer may be disposed on the second side of the negative electrode current collector, the first porous negative electrode active material layer may be disposed on the first side of the negative electrode current collector over the first nonporous lithium metal layer, and the second porous negative electrode active material layer may be disposed on the second side of the negative electrode current collector over the second nonporous lithium metal layer.

The lithium metal layer may be disposed on a major facing surface of the first porous negative electrode active material layer or on a major facing surface of the second porous negative electrode active material layer. In such case, the negative electrode current collector may be porous and may include a plurality of through-holes extending from the first side to the second side thereof.

At least one of the first porous negative electrode active material layer or the second porous negative electrode active material layer may include a silicon-based electrochemically active material.

The lithium metal layer may be nonporous and may have a thickness in a range of 20 micrometers to 40 micrometers.

A method of assembling a secondary lithium battery is provided. In the method, a first porous negative electrode active material layer may be deposited on a first side of a negative electrode current collector and a second porous negative electrode active material layer may be deposited on an opposite second side of the negative electrode current collector. A lithium metal layer may be laminated (i) between the first porous negative electrode active material layer and the second porous negative electrode active material layer or (ii) on a major facing surface of the first porous negative electrode active material layer or on a major facing surface of the second porous negative electrode active material layer. A porous positive electrode active material layer may be deposited on a positive electrode current collector. A porous separator layer may be positioned between the porous positive electrode active material layer and either the first porous negative electrode active material layer or the second porous negative electrode active material layer. The porous separator layer, the porous positive electrode active material layer, the first porous negative electrode active material layer, and the second porous negative electrode active material layer may be infiltrated with a nonaqueous electrolyte. The electrolyte may contact a major surface of the lithium metal layer and establish a lithium ion transport path between the lithium metal layer and at least one of the first porous negative electrode active material layer or the second porous negative electrode active material layer.

The negative electrode current collector may include a first porous metal layer and a second porous metal layer spaced apart from the first porous metal layer. In such case, the first porous negative electrode active material layer may be deposited on a major surface of the first porous metal layer, and the second porous negative electrode active material layer may be deposited on a major surface of the second porous metal layer. The lithium metal layer may be laminated between confronting surfaces of the first porous metal layer and the second porous metal layer. The electrolyte may contact a first major surface of the lithium metal layer and a second major surface of the lithium metal layer. The electrolyte may establish a lithium ion transport path (i) between the lithium metal layer and the first porous negative electrode active material layer and (ii) between the lithium metal layer and the second porous negative electrode active material layer.

The above summary is not intended to represent every possible embodiment or every aspect of the present disclosure. Rather, the foregoing summary is intended to exemplify some of the novel aspects and features disclosed herein. The above features and advantages, and other features and advantages of the present disclosure, will be readily apparent from the following detailed description of representative embodiments and modes for carrying out the present disclosure when taken in connection with the accompanying drawings and the appended claims.

BRIEF DESCRIPTION OF THE DRAWINGS

Illustrative embodiments will hereinafter be described in conjunction with the appended drawings, wherein like designations denote like elements, and wherein.

The present disclosure is susceptible to modifications and alternative forms, with representative embodiments shown by way of example in the drawings and described in detail below. Inventive aspects of this disclosure are not limited to the particular forms disclosed. Rather, the present disclosure is intended to cover modifications, equivalents, combinations, and alternatives falling within the scope of the disclosure as defined by the appended claims.

DETAILED DESCRIPTION

The presently disclosed doubled-sided negative electrodes can be used to assemble secondary lithium batteries that include a stoichiometric surplus of lithium in their negative electrodes prior to initial battery charging. The negative electrodes are "doubled-sided," meaning that each of the negative electrodes includes discrete first and second layers of electrochemically active negative electrode material disposed on opposite sides of a negative electrode current collector. Each of the negative electrodes also includes a lithium metal layer, which may be disposed between the first and second negative electrode active material layers or on a major facing surface of either the first or the second negative electrode active material layer.

In assembly, an electrolyte infiltrates the first and second negative electrode active material layers and establishes an ionically conductive pathway for the transport of lithium ions from the lithium metal layer to the first and/or the second negative electrode active material layers prior to initial cycling and operation of the battery. As such, the lithium metal layer may be referred to as being "ionically coupled" to the first and/or second negative electrode active material layers via the electrolyte. When the electrochemical cells of the battery are infiltrated with the electrolyte, lithium ions will be released from the lithium metal layer and intercalated into the first and second negative electrode active material layers of the negative electrodes, thereby "prelithiating" the negative electrode active material layers prior to initial battery cycling. The surplus of lithium in the prelithiated negative electrode active material layers may compensate for the loss of active lithium in the electrochemical cells of the battery, which may occur during initial cycling or repeated cycling of the battery, for example, due to various lithium-consuming parasitic chemical reactions within the electrochemical cells of the battery. As such, the presently disclosed doubled-sided negative electrodes may help increase the reversible capacity and cycle life of secondary lithium batteries.

Figure 1:
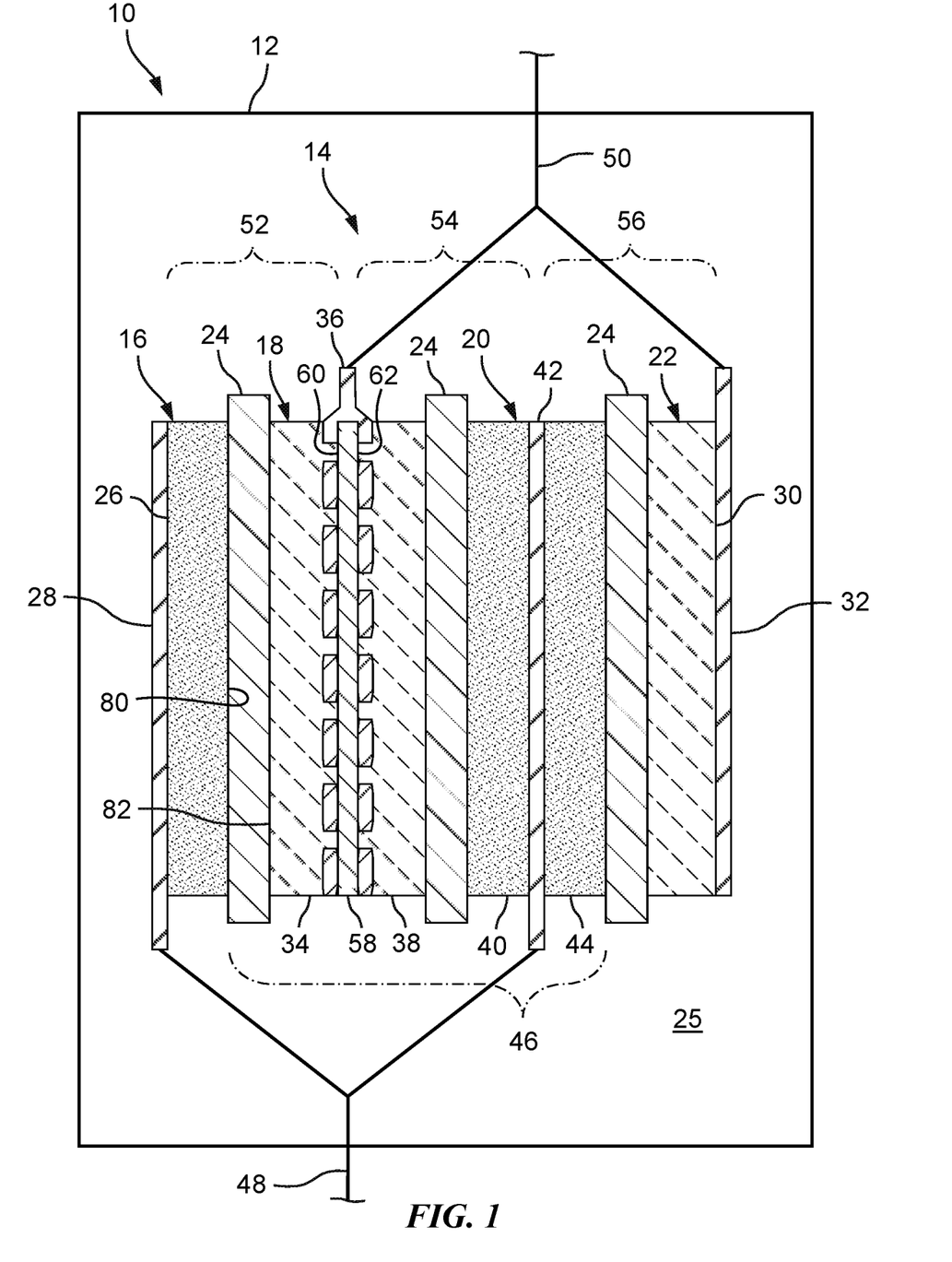
FIG. 1 is a schematic side cross-sectional view of a secondary lithium battery including an electrochemical cell stack enclosed within a battery case and infiltrated with an electrolyte, wherein the electrochemical cell stack includes a doubled-sided negative electrode including a porous current collector, first and second negative electrode active material layers disposed on opposite sides of the current collector, and a lithium metal layer disposed between the first and second negative electrode active material layers.

FIG. 1 depicts a secondary lithium battery 10 including a battery case 12 and an electrochemical cell stack 14 enclosed within the battery case 12. The battery case 12 may comprise a metal, such as aluminum or steel, or the battery case 12 may comprise a film pouch material with multiple laminated layers of metal and/or plastic. The electrochemical cell stack 14 includes a stack of positive and negative electrodes 16, 18, 20, 22 electrically isolated from one another by porous separator layers 24. In assembly, the positive and negative electrodes 16, 18, 20, 22 and the porous separator layers 24 of the electrochemical cell stack 14 are infiltrated with an ionically conductive nonaqueous electrolyte 25, for example, by filling the battery case 12 with the electrolyte 25.

The positive and negative electrodes 16, 22 disposed at the ends of the electrochemical cell stack 14 are single-sided, meaning that the electrodes 16, 22 each include a single layer of electrochemically active negative or positive electrode material disposed on one side of a metal current collector. More specifically, the positive electrode 16 disposed at a first end of the electrochemical cell stack 14 includes a positive electrode active material layer 26 disposed on a positive electrode current collector 28, and the negative electrode 22 disposed at an opposite second end of the electrochemical cell stack 14 includes a negative electrode active material layer 30 disposed on a negative electrode current collector 32. The negative and positive electrodes 18, 20 disposed between the single-sided positive and negative electrodes 16, 22 are doubled-sided, meaning that the electrodes 18, 20 each include two discrete layers of electrochemically active negative or positive electrode material disposed on opposite sides of a metal current collector. More specifically, the doubled-sided negative electrode 18 includes a first negative electrode active material layer 34 disposed on a first side of a negative electrode current collector 36 and a second negative electrode active material layer 38 disposed on an opposite second side of the negative electrode current collector 36. The doubled-sided positive electrode 20 includes a first positive electrode active material layer 40 disposed on a first side of a positive electrode current collector 42 and a second positive electrode active material layer 44 disposed on an opposite second side of the positive electrode current collector 42.

In FIG. 1, the battery 10 includes one doubled-sided negative electrode 18 and one doubled-sided positive electrode 20 spaced-apart from the doubled-sided negative electrode 18 by a porous separator layer 24. In practice, however, the battery 10 may include multiple repeating units 46 of doubled-sided negative and positive electrodes 18, 20 spaced-apart from one another by porous separator layers 24. The positive and negative electrodes 16, 18, 20, 22 and the porous separator layers 24 may be assembled in the form of a stack, for example, using a round winding, prismatic winding, single sheet stacking, Z-folding, or other cell stacking process. In assembly, the positive electrode current collectors 28, 42 may be electrically coupled to a positive polarity tab 48 and the negative electrode current collectors 32, 36 may be electrically coupled to a negative polarity tab 50. The positive and negative polarity tabs 48, 50 may extend outside of the battery case 12 and may be coupled to a power source or load via an external circuit (not shown).

Prior to hermetically sealing the electrochemical cell stack 14 within the battery case 12, the positive and negative electrodes 16, 18, 20, 22 and the porous separator layers 24 are infiltrated with the ionically conductive nonaqueous electrolyte 25. When infiltrated with the nonaqueous electrolyte 25, each adjacent pair of positive and negative electrode active material layers 26, 34, 38, 40, 44, 30 defines one electrochemical cell of the battery 10. In FIG. 1, a first electrochemical cell 52 is defined by the positive electrode active material layer 26 disposed on the positive electrode current collector 28 and the first negative electrode active material layer 34 disposed on the first side of the negative electrode current collector 36. A second electrochemical cell 54 is defined by the second negative electrode active material layer 38 disposed on the second side of the negative electrode current collector 36 and the first positive electrode active material layer 40 disposed on the first side of the positive electrode current collector 42, and a third electrochemical cell 56 is defined by the second positive electrode active material layer 44 disposed on the second side of the positive electrode current collector 42 and the negative electrode active material layer 30 disposed on the negative electrode current collector 32.

The doubled-sided negative electrode 18 is configured to provide one or both of its associated electrochemical cells 52, 54 with a stoichiometric surplus of lithium prior to initial charging and operation of the battery 10. To accomplish this, the negative electrode 18 includes a lithium metal layer 58 having a first major surface 60 and an opposite second major surface 62. The doubled-sided negative electrode 18 is configured such that, when the negative electrode 18 is infiltrated with the electrolyte 25, the lithium metal layer 58 is in physical contact with the electrolyte 25 and is ionically coupled to at least one of the first or second negative electrode active material layers 34, 38 via the electrolyte 25. In assembly, the electrolyte 25 may be in physical contact with first major surface 60 and/or the second major surface 62 of the lithium metal layer 58. In such an arrangement, the electrolyte 25 enables lithium ion transport from the lithium metal layer 58 into the first and/or second negative electrode active material layers 34, 38 prior to initial cycling and operation of the battery 10. In embodiments, the lithium metal layer 58 may be disposed between the first and second negative electrode active material layers 34, 38 (as in FIGS. 1 and 5), or the lithium metal layer 58 may be disposed on a major facing surface of either the first or the second negative electrode active material layers 34, 38 (as in FIG. 4).

The porous separator layers 24 are interposed between confronting or facing surfaces of adjacent pairs of positive and negative electrode active material layers 26, 34, 38, 40, 44, 30. The porous separator layers 24 may be made of microporous ionically conductive and electrically insulating thin films. For example, in the first electrochemical cell 52, a confronting or facing surface 80 of the positive electrode active material layer 26 is spaced apart from a confronting or facing surface 82 of the negative electrode active material layer 34 by one of the porous separator layers 24. Each of the porous separator layers 24 may comprise a non-woven material, e.g., a manufactured sheet, web, or matt of directionally or randomly oriented fibers. In embodiments, each of the porous separator layers 24 may comprise a microporous polymeric material, e.g., a microporous polyolefin-based membrane or film. For example, each of the porous separator layers 24 may comprise a single polyolefin or a combination of polyolefins, such as polyethylene (PE), polypropylene (PP), polyamide (PA), poly(tetrafluoroethylene) (PTFE), polyvinylidene fluoride (PVdF), and/or poly (vinyl chloride) (PVC). In one form, one or more of the porous separator layers 24 may comprise a laminate of one or more polymeric materials, such as a laminate of PE and PP.

The nonaqueous electrolyte 25 facilitates transport of lithium ions between the adjacent pairs of positive and negative electrode active material layers 26, 34, 38, 40, 44, 30 within the electrochemical cell stack 14 of the battery 10. The nonaqueous electrolyte 25 may be a nonaqueous liquid electrolyte solution including one or more lithium salts dissolved in a nonaqueous aprotic organic solvent or a mixture of nonaqueous aprotic organic solvents. Examples of lithium salts include lithium hexafluorophosphate ($LiPF_6$), lithium perchlorate ($LiClO_4$), lithium tetrachloroaluminate ($LiAlCl_4$), lithium iodide (LiI), lithium bromide (LiBr), lithium thiocyanate (LiSCN), lithium tetrafluoroborate (LiBF$_4$), lithium tetraphenylborate (LiB(C$_6$H$_5$)$_4$), lithium bis(oxalato)borate (LiB(C$_2$O$_4$)$_2$) (LiBOB), lithium difluorooxalatoborate (LiBF$_2$(C$_2$O$_4$)), lithium hexafluoroarsenate (LiAsF$_6$), lithium trifluoromethanesulfonate (LiCF$_3$SO$_3$), lithium bis(trifluoromethane)sulfonylimide (LiN(CF$_3$SO$_2$)$_2$), lithium bis(fluorosulfonyl)imide (LiN(FSO$_2$)$_2$) (LiSFI), and combinations thereof. Examples of nonaqueous aprotic organic solvents include alkyl carbonates, for example, cyclic carbonates (e.g., ethylene carbonate (EC), propylene carbonate (PC), butylene carbonate (BC), fluoroethylene carbonate (FEC)), linear carbonates (e.g., dimethyl carbonate (DMC), diethyl carbonate (DEC), ethylmethylcarbonate (EMC)), aliphatic carboxylic esters (e.g., methyl formate, methyl acetate, methyl propionate), γ-lactones (e.g., γ-butyrolactone, γ-valerolactone), chain structure ethers (e.g., 1,2-dimethoxyethane, 1-2-diethoxyethane, ethoxymethoxyethane), cyclic ethers (e.g., tetrahydrofuran, 2-methyltetrahydrofuran), 1,3-dioxolane), sulfur compounds (e.g., sulfolane), and combinations thereof.

The positive electrode active material layers 26, 40, 44 are porous and may comprise one or more electrochemically active materials that can undergo a reversible redox reaction with lithium at a higher electrochemical potential than the electrochemically active material of the negative electrode active material layers 30, 34, 38 such that an electrochemical potential difference exists between adjacent pairs of positive and negative electrode active material layers 26, 34, 38, 40, 44, 30. For example, the positive electrode active material layers 26, 40, 44 may comprise a material that can sufficiently undergo lithium intercalation and deintercalation, alloying and dealloying, or plating and stripping. In one form, the positive electrode active material layers 26, 40, 44 may comprise an intercalation host material that can undergo the reversible insertion or intercalation of lithium ions. In such case, the intercalation host material may comprise a layered oxide represented by the formula LiMeO$_2$, an olivine-type oxide represented by the formula LiMePO$_4$, a spinel-type oxide represented by the formula LiMe$_2$O$_4$, a tavorite represented by one or both of the following formulas LiMeSO$_4$F or LiMePO$_4$F, or a combination thereof, where Me is a transition metal (e.g., Co, Ni, Mn, Fe, Al, V, or a combination thereof). In another form, the positive electrode active material layers 26, 40, 44 may comprise a conversion material including a component that can undergo a reversible electrochemical reaction with lithium, in which the component undergoes a phase change or a change in crystalline structure accompanied by a change in oxidation state. In such case, the conversion material may comprise sulfur, selenium, tellurium, iodine, a halide (e.g., a fluoride or chloride), sulfide, selenide, telluride, iodide, phosphide, nitride, oxide, oxysulfide, oxyfluoride, sulfur-fluoride, sulfur-oxyfluoride, or a lithium and/or metal compound thereof. Examples of metals for inclusion in the conversion material include iron, manganese, nickel, copper, and cobalt. In embodiments, the electrochemically active material of the positive electrode active material layers 26, 40, 44 may be intermingled with a polymeric binder to provide the layers 26, 40, 44 with structural integrity. Examples of polymeric binders include polyvinylidene fluoride (PVdF), ethylene propylene diene monomer (EPDM) rubber, styrene butadiene rubber (SBR), carboxymethyl cellulose (CMC), polyacrylic acid, and mixtures thereof. The positive electrode active material layers 26, 40, 44 optionally may include particles of an electrically conductive material, which may comprise particles of, for example, high-surface area carbon black.

The negative electrode active material layers 30, 34, 38 are porous and may comprise an electrochemically active material that can undergo the reversible insertion or intercalation of lithium ions or that can react with lithium to form a lithium-containing intermetallic compound. In embodiments, the electrochemically active material of the negative electrode active material layers 30, 34, 38 may comprise a silicon-based material. The term "silicon-based," as used herein with respect to the electrochemically active material of the negative electrode active material layers 30, 34, 38, broadly includes materials in which silicon (Si) is the single largest constituent on a weight percentage (%) basis. This may include materials having, by weight, greater than 50% silicon, as well as those having, by weight, less than 50% silicon, so long as silicon is the single largest constituent of the material. In addition to silicon, the electrochemically active material of the negative electrode active material layers 30, 34, 38 may comprise carbon (e.g., graphite, activated carbon, carbon black, and/or graphene), tin oxide, aluminum, indium, zinc, germanium, titanium oxide, and/or lithium titanate. The electrochemically active material of the negative electrode active material layers 30, 34, 38 may be intermingled with a polymeric binder to provide the layers 30, 34, 38 with structural integrity. Examples of polymeric binders include polyvinylidene fluoride (PVdF), ethylene propylene diene monomer (EPDM) rubber, styrene butadiene rubber (SBR), carboxymethyl cellulose (CMC), polyacrylic acid, and mixtures thereof. The negative electrode active material layers 30, 34, 38 optionally may include particles of an electrically conductive material, which may comprise particles of, for example, high-surface area carbon black.

In certain embodiments, the silicon-based electrochemically active material of the negative electrode active material layers 30, 34, 38 may comprise silicon, carbon coated silicon, silicon oxide, a lithium silicon alloy, a silicon tin alloy, a silicon iron alloy, a silicon aluminum alloy, a silicon cobalt alloy, or a combination thereof. Examples of such silicon alloys include but are not limited, to Si—Sn, SiSnFe, SiSnAl, SiFeCo, and the like. In certain embodiments, the silicon-based electrochemically active material comprises or consists essentially of silicon (rather than an alloy of silicon) in either crystalline or amorphous structures. Silicon-based electrochemically active materials and methods of forming such materials are described in U.S. patent application Ser. No. 17/085,785 filed Oct. 30, 2020, the contents of which are incorporated herein by reference in their entirety.

The positive electrode current collectors 28, 42 and the positive polarity tab 48 may be formed from aluminum (Al) or another appropriate electrically conductive material. The negative electrode current collectors 32, 36 and the negative polarity tab 50 may be made of copper, nickel, or alloys thereof, stainless steel, or other appropriate electrically conductive material. The positive and negative electrode current collectors 28, 42, 32, 36 may be porous or nonporous. For example, the positive and negative electrode current collectors 28, 42, 32, 36 may be in the form of nonporous metal foils, perforated metal foils, porous metal meshes, or a combination thereof.

The lithium metal layer 58 may comprise a layer of lithium (Li) metal or a lithium metal alloy. In some embodiments, the negative electrode material layer 34 may consist essentially of lithium metal and may comprise, by weight, greater than 97% lithium or, more preferably, greater than 99% lithium. The lithium metal layer 58 may be porous or nonporous. For example, the lithium metal layer 58 may be in the form of a nonporous metal foil, a perforated (porous)

metal foil, or a porous metal mesh. The lithium metal layer 58 may have a thickness in a range of 20 micrometers to 40 micrometers.

Figure 2:
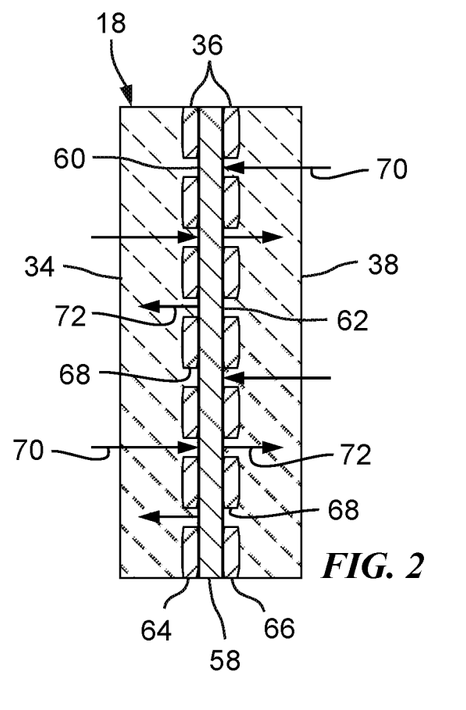
FIG. 2 is a schematic side cross-sectional view of the doubled-sided negative electrode of FIG. 1 depicting the electrolyte infiltrating the first and second negative electrode active material layers of the doubled-sided negative electrode and the movement of lithium ions from the lithium metal layer into the first and second negative electrode active material layers along the ionically conductive pathway established by the electrolyte.

Referring now to FIG. 2, the negative electrode current collector 36 of the doubled-sided negative electrode 18 may include a first porous metal layer 64 and a second porous metal layer 66 spaced apart from the first porous metal layer 64, and the lithium metal layer 58 may be sandwiched between the first porous metal layer 64 and the second porous metal layer 66, for example, by being laminated therebetween. The lithium metal layer 58 may be nonporous and may be in the form of a nonporous lithium metal foil. The first and second porous metal layers 64, 66 include a plurality of through-holes 68 that extend from a first side to a second side thereof. A portion of the first negative electrode active material layer 34 may extend at least part-way through the through-holes 68 in the first porous metal layer 64, and a portion of the second negative electrode active material layer 38 may extend at least part-way through the through-holes 68 in the second porous metal layer 66.

When the negative electrode 18 is infiltrated with the electrolyte 25, the electrolyte 25 infiltrates the pores of the porous first and second negative electrode active material layers 34, 38, flows through the through-holes 68 in the first and second porous metal layers 64, 66 (as shown by arrows 70), and comes into direct physical contact with the first and second major surfaces 60, 62 of the lithium metal layer 58. When the electrolyte 25 makes physical contact with the first and second major surfaces 60, 62 of the lithium metal layer 58, an ionically conductive pathway is established within the negative electrode 18 that allows for the transport of lithium ions from the lithium metal layer 58 into the first and/or the second negative electrode active material layers 34, 38 (as shown by arrows 72). Lithium ions released from the lithium metal layer 58 and intercalated into the negative electrode active material layers 34, 38 may provide the associated electrochemical cells 52, 54 with a stoichiometric surplus of active lithium to take part in the electrochemical reactions occurring within the cells 52, 54.

The configuration and arrangement of the first and second negative electrode active material layers 34, 38, the first and second porous metal layers 64, 66 of the negative electrode current collector 36, and the lithium metal layer 58 in the negative electrode 18 allows the first and second negative electrode active material layers 34, 38 to be prelithiated prior to operation of the battery 10, without inhibiting the flow of the electrolyte 25 through the positive and negative electrodes 16, 18, 20, 22 and the porous separator layers 24 of the electrochemical cell stack 14. In particular, without intending to be bound by theory, it is believed that, if the negative electrode current collector 36 was nonporous and a nonporous lithium metal layer 58 was formed on a major facing surface of the first (or second) negative electrode active material layer 34, the nonporous lithium metal layer 58 and the negative electrode current collector 36 would create barriers to the flow of the electrolyte 25 and would effectively isolate the first (or second) negative electrode active material layer 34 from the electrolyte 25 during initial operation of the battery 10. In addition, if the negative electrode current collector 36 was nonporous and a nonporous lithium metal layer 58 was formed on a major facing surface of the first (or second) negative electrode active material layer 34, it is believed that the lithium metal layer 58 would need to be relatively thin (e.g., less than 20 micrometers in thickness) to avoid excess lithium from remaining on or subsequently plating on the surface of the first (or second) negative electrode active material layer 34 after initial charging or cycling of the battery 10. However, the use of lithium metal foils with thicknesses of less than 20 micrometers is relatively expensive due to the greater incidence of manufacturing defects, which may increase the amount of scrap lithium produced during the manufacturing process.

Figure 3:
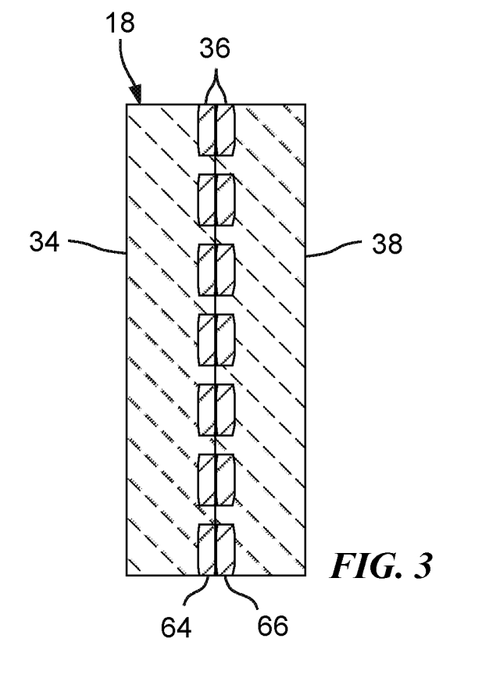
FIG. 3 is a schematic side cross-sectional view of the doubled-sided negative electrode of FIG. 1 after initial charging and/or repeated cycling of the battery and after all of the lithium ions in the lithium metal layer have been consumed by electrochemical reactions occurring within the battery.

After lithium ions are released from the lithium metal layer 58, the lithium ions will be intercalated into the negative electrode active material layers 34, 38, dissolved in the electrolyte 25, and/or intercalated into the positive electrode active material layers 26, 40. The lithium ions released from the lithium metal layer 58 will generally not return thereto. As shown in FIG. 3, after initial charging and/or repeated cycling of the battery 10, the lithium ions in the lithium metal layer 58 may be entirely consumed by the electrochemical reactions occurring within the electrochemical cells 52, 54. In such case, the first and second perforated metal foils 64, 66 of the negative electrode current collector 36 may gradually be brought closer together and may eventually contact each other along their confronting surfaces.

Figure 4:
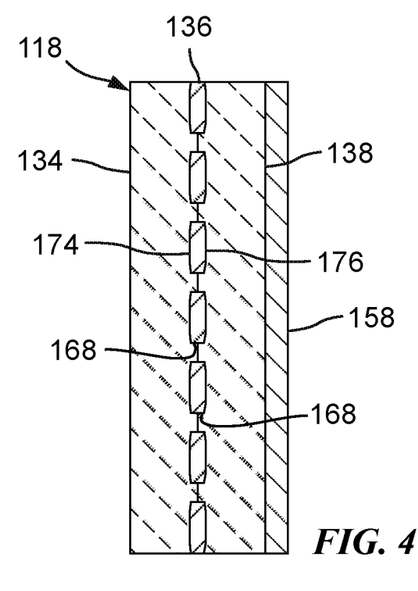
FIG. 4 is a schematic side cross-sectional view of another doubled-sided negative electrode for a secondary lithium battery including a porous current collector, first and second negative electrode active material layers disposed on opposite sides of the current collector, and a lithium metal layer disposed on one side of the current collector over the first or the second negative electrode active material layer.

FIG. 4 depicts another embodiment of a double-sided negative electrode 118 for a secondary lithium battery, such as the battery 10 shown and described with respect to FIG. 1. The double-sided negative electrode 118 is similar in many respects to the negative electrode 18 depicted in FIG. 1, and a description of common subject matter generally may not be repeated here. The double-sided negative electrode 118 includes a negative electrode current collector 136 in the form of a porous metal layer including a plurality of through-holes 68 that extend from a first side 174 to a second side 176 thereof. A first negative electrode active material layer 134 is formed on the first side 174 of the negative electrode current collector 136 and a second negative electrode active material layer 138 is formed on the second side 176 of the negative electrode current collector 136. A portion of the first negative electrode active material layer 134 may extend at least part-way through the through-holes 168 in the current collector 136 and/or a portion of the second negative electrode active material layer 138 may extend at least part-way through the through-holes 168 in the second negative electrode active material layer 138. A lithium metal layer 158 is formed on the second side 176 of the negative electrode current collector 136 over the second negative electrode active material layer 138. In other embodiments, the lithium metal layer 158 may be formed on the first side 174 of the negative electrode current collector 136 over the first negative electrode active material layer 134 (not shown). The lithium metal layer 158 may be nonporous and may be in the form of a nonporous lithium metal foil.

When the negative electrode 118 is infiltrated with the electrolyte 25, the electrolyte 25 infiltrates the pores of the porous first and second negative electrode active material layers 134, 138, flows through the through-holes 168 in the negative electrode current collector 136, and comes into direct physical contact with the lithium metal layer 158. When the electrolyte 25 makes physical contact with the lithium metal layer 158, an ionically conductive pathway is established within the negative electrode 118 that allows for the transport of lithium ions from the lithium metal layer 158 into the first and/or the second negative electrode active material layers 134, 138. Lithium ions released from the lithium metal layer 158 and intercalated into the negative electrode active material layers 134, 138 may provide their associated electrochemical cells with a stoichiometric surplus of active lithium.

The configuration and arrangement of the first and second negative electrode active material layers 134, 138, the negative electrode current collector 136, and the lithium metal layer 158 in the negative electrode 118 allows the first and second negative electrode active material layers 134, 138 to be prelithiated prior to operation of the battery 10 without inhibiting the flow of the electrolyte 25 through the positive and negative electrodes and the porous separator layers of the battery 10.

Figure 5:
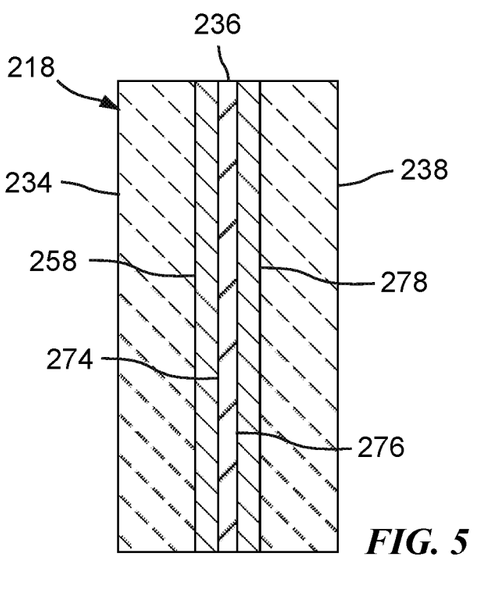
FIG. 5 is a schematic side cross-sectional view of another doubled-sided negative electrode for a secondary lithium battery including a nonporous current collector, first and second lithium metal layers disposed on opposite sides of the current collector, and first and second negative electrode active material layers disposed on opposite sides of the current collector over the first and second lithium metal layers.

FIG. 5 depicts another embodiment of a double-sided negative electrode 218 for a secondary lithium battery, such as the battery 10 shown and described with respect to FIG. 1. The double-sided negative electrode 218 is similar in many respects to the negative electrode 18 depicted in FIG. 1, and a description of common subject matter generally may not be repeated here. The double-sided negative electrode 218 includes a negative electrode current collector 236 in the form of a nonporous metal foil having a first side 274 and an opposite second side 276 thereof. A first lithium metal layer 258 is formed on the first side 274 of the negative electrode current collector 236 and a second lithium metal layer 278 is formed on the second side 276 of the negative electrode current collector 236. The first and second lithium metal layers 258, 278 may be nonporous and may be in the form of nonporous lithium metal foils. A first negative electrode active material layer 234 is formed on the first side 274 of the negative electrode current collector 236 over the first lithium metal layer 258, and a second negative electrode active material layer 238 is formed on the second side 276 of the negative electrode current collector 236 over the second lithium metal layer 278.

When the negative electrode 218 is infiltrated with the electrolyte 25, the electrolyte 25 infiltrates the pores of the porous first and second negative electrode active material layers 234, 238 and comes into direct physical contact with the first and second lithium metal layers 258, 278. When the electrolyte 25 makes physical contact with the lithium metal layers 258, 278, an ionically conductive pathway is established within the negative electrode 218 that allows for the transport of lithium ions from the lithium metal layers 258, 278 into the first and/or the second negative electrode active material layers 234, 238. Lithium ions released from the lithium metal layers 258, 278 and intercalated into the negative electrode active material layers 234, 238 may provide their associated electrochemical cells with a stoichiometric surplus of active lithium.

The configuration and arrangement of the lithium metal layers 258, 278 and the first and second negative electrode active material layers 234, 238 on the first and second sides 274, 276 of the negative electrode current collector 236 allows the first and second negative electrode active material layers 234, 238 to be prelithiated prior to operation of the battery 10 without inhibiting the flow of the electrolyte 25 through the positive and negative electrodes and the porous separator layers of the battery 10.

These and other benefits will be readily appreciated by those of ordinary skill in the art in view of the forgoing disclosure.

While some of the best modes and other embodiments have been described in detail, various alternative designs and embodiments exist for practicing the present teachings defined in the appended claims. Those skilled in the art will recognize that modifications may be made to the disclosed embodiments without departing from the scope of the present disclosure. Moreover, the present concepts expressly include combinations and sub-combinations of the described elements and features. The detailed description and the drawings are supportive and descriptive of the present teachings, with the scope of the present teachings defined solely by the claims.

What is claimed is:

1. A negative electrode for a secondary lithium battery, the negative electrode comprising:
    a negative electrode current collector having a first side and an opposite second side;
    a first porous negative electrode active material layer disposed on the first side of the negative electrode current collector;
    a second porous negative electrode active material layer disposed on the second side of the negative electrode current collector, the first porous negative electrode active material layer and the second porous negative electrode active material layer each comprising an electrochemically active material intermingled with a polymeric binder, wherein the electrochemically active material can undergo the reversible intercalation of lithium ions or can react with lithium to form a lithium-containing intermetallic compound;
    a lithium metal layer disposed between the first porous negative electrode active material layer and the second porous negative electrode active material layer; and
    an electrolyte infiltrating the first porous negative electrode active material layer and the second porous negative electrode active material layer, the electrolyte being in contact with at least a portion of a major surface of the lithium metal layer,
    wherein the electrolyte establishes a lithium ion transport path between the lithium metal layer and at least one of the first porous negative electrode active material layer or the second porous negative electrode active material layer.

2. The negative electrode of claim 1 wherein the negative electrode current collector includes a first porous metal layer and a second porous metal layer spaced apart from the first porous metal layer, wherein the lithium metal layer is sandwiched between confronting surfaces of the first porous metal layer and the second porous metal layer, and wherein the electrolyte is in contact with at least a portion of a first major surface and at least a portion of an opposite second major surface of the lithium metal layer.

3. The negative electrode of claim 2 wherein the first porous negative electrode active material layer is disposed on a major surface of the first porous metal layer and the second porous negative electrode active material layer is disposed on a major surface of the second porous metal layer.

4. The negative electrode of claim 1 wherein the negative electrode current collector is nonporous, a first lithium metal layer is disposed on the first side of the negative electrode current collector, a second lithium metal layer is disposed on the second side of the negative electrode current collector, the first porous negative electrode active material layer is disposed on the first side of the negative electrode current collector over the first lithium metal layer, and the second porous negative electrode active material layer is disposed on the second side of the negative electrode current collector over the second lithium metal layer.

5. The negative electrode of claim 4 wherein the first and second lithium metal layers are nonporous.

6. The negative electrode of claim 1 wherein the negative electrode current collector is porous and includes a plurality of through-holes extending from the first side to the second side thereof, and wherein at least a portion of the first porous negative electrode active material layer or the second porous negative electrode active material layer extends at least part-way into the plurality of through-holes in the negative electrode current collector.

7. The negative electrode of claim 1 wherein at least one of the first porous negative electrode active material layer or the second porous negative electrode active material layer includes a silicon-based electrochemically active material.

8. The negative electrode of claim 1 wherein the lithium metal layer is nonporous and has a thickness in a range of 20 micrometers to 40 micrometers.

9. A secondary lithium battery comprising:
a positive electrode including a porous positive electrode active material layer electrically coupled to a positive electrode current collector;
a double-sided negative electrode including:
  a negative electrode current collector having a first side and an opposite second side;
  a first porous negative electrode active material layer disposed on the first side of the negative electrode current collector;
  a second porous negative electrode active material layer disposed on the second side of the negative electrode current collector, the first porous negative electrode active material layer and the second porous negative electrode active material layer each comprising an electrochemically active material intermingled with a polymeric binder, wherein the electrochemically active material can undergo the reversible intercalation of lithium ions or can react with lithium to form a lithium-containing intermetallic compound; and
  a lithium metal layer disposed between the first porous negative electrode active material layer and the second porous negative electrode active material layer;
a porous separator layer disposed between the porous positive electrode active material layer of the positive electrode and the first or second porous negative electrode active material layer of the negative electrode, the porous separator layer electrically isolating the porous positive electrode active material layer of the positive electrode from the first or second porous negative electrode active material layer of the negative electrode; and
an electrolyte infiltrating the porous separator layer, the porous positive electrode active material layer of the positive electrode, the first porous negative electrode active material layer of the negative electrode, and the second porous negative electrode active material layer of the negative electrode,
wherein the electrolyte is in contact with at least a portion of a major surface of the lithium metal layer, and
wherein the electrolyte establishes a lithium ion transport path between the lithium metal layer and at least one of the first porous negative electrode active material layer or the second porous negative electrode active material layer.

10. The battery of claim 9 wherein the lithium metal layer is nonporous, and wherein, prior to initial charging or cycling of the battery, the lithium metal layer does not create a physical barrier to the transport of lithium ions between the porous positive electrode active material layer of the positive electrode and the first or second porous negative electrode active material layer of the negative electrode.

11. The battery of claim 9 wherein the negative electrode current collector includes a first porous metal layer and a second porous metal layer spaced apart from the first porous metal layer, wherein the lithium metal layer is sandwiched between confronting surfaces of the first porous metal layer and the second porous metal layer, and wherein the electrolyte is in contact with at least a portion of a first major surface and at least a portion of an opposite second major surface of the lithium metal layer.

12. The battery of claim 9 wherein the negative electrode current collector is nonporous, a first nonporous lithium metal layer is disposed on the first side of the negative electrode current collector, a second nonporous lithium metal layer is disposed on the second side of the negative electrode current collector, the first porous negative electrode active material layer is disposed on the first side of the negative electrode current collector over the first nonporous lithium metal layer, and the second porous negative electrode active material layer is disposed on the second side of the negative electrode current collector over the second nonporous lithium metal layer.

13. The battery of claim 9 wherein at least one of the first porous negative electrode active material layer or the second porous negative electrode active material layer includes a silicon-based electrochemically active material.

14. The battery of claim 9 wherein the lithium metal layer is nonporous and has a thickness in a range of 20 micrometers to 40 micrometers.

15. The negative electrode of claim 7 wherein the polymeric binder comprises polyvinylidene fluoride (PVdF), ethylene propylene diene monomer (EPDM) rubber, styrene butadiene rubber (SBR), carboxymethyl cellulose (CMC), polyacrylic acid, or a combination thereof.

16. The battery of claim 9 wherein the porous positive electrode active material layer comprises an intercalation host material that can undergo the reversible intercalation of lithium ions.

* * * * *